Jan. 24, 1967     L. A. McCOY     3,299,819

MAGNETIC DRIVE

Filed Dec. 7, 1964     2 Sheets-Sheet 1

INVENTOR.
LEE A. McCOY
BY
Townsend *and* Townsend
ATTORNEYS

Jan. 24, 1967  L. A. McCOY  3,299,819
MAGNETIC DRIVE
Filed Dec. 7, 1964  2 Sheets-Sheet 2
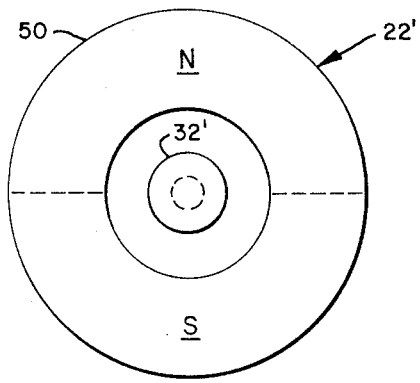
FIG_5
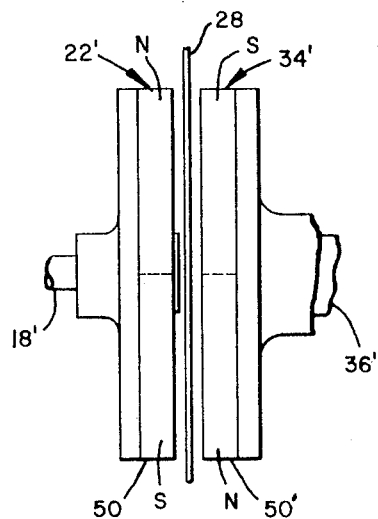
FIG_6
INVENTOR.
LEE A. McCOY
BY
Townsend & Townsend
ATTORNEYS 3,299,819
MAGNETIC DRIVE
Lee A. McCoy, San Mateo, Calif., assignor by direct and mesne assignments, to Flo-Mac, Inc., a corporation of California
Filed Dec. 7, 1964, Ser. No. 416,339
6 Claims. (Cl. 103—87)

This invention relates to fluid-handling apparatus and more particularly relates to magnetic drives employed in driving pumps, compressors and other apparatus employed in handling fluids at relatively high and low pressures.

One of the problems encountered in systems under evacuation or compression disclosed in the prior art and which utilize rotary drive is the requirement of a rotary seal with its inherent limitations, so that past solutions have included a magnetic drive member separated from its corresponding driven member by a thin non-ferrous diaphragm.

Thus, a typical system includes a set of permanent magnets mounted on a driving member on one side of the diaphragm and a set of magnetic elements mounted on the impeller or driven member on the opposite side of the diaphragm. Upon rotation of the driving member magnetic attraction causes rotation of the driven member. That is, the magnetic elements on the driving member attract the corresponding magnetic elements of opposite polarity in the impeller or driven member.

The system described above thus avoids the problems resulting from the utilization of a rotary seal. This system, however, is not completely problem free. For example, in order to provide maximum flux transmission, the diaphragm separating the driver and driven members is made very thin which in turn increases the susceptibility to rupture. If on the other hand the diaphragm's thickness is increased, the efficiency of the magnetic drive under load conditions is decreased.

One proposal for avoiding rupture of the diaphragm while keeping the thickness of the diaphram relatively small is to provide the diaphragm with a supporting plate mounted on the surface of the central portion of the diaphragm and with a shaft extending through both the plate and the diaphragm through appropriate openings to hold the diaphragm in place. Unfortunately, this proposal requires the use of additional sealing with the inherent problems involved.

Another proposal for solving the problems mentioned above includes a diaphragm having a reenforced center section of increased thickness in combination with magnetic driver and driven members separated by the thin portion of the diaphragm to avoid inefficiency in the flux transmission. In addition to the obvious disadvantage of increased cost in the manufacture of the diaphragm, the problem of susceptibility to rupture is not completely solved since the diaphragm may rupture eventually due to the wearing caused by the rotating drive shaft against which the diaphragm is caused to rest, especially during bursts of pressure.

Consequently, an object of this invention is to provide an improved magnetic drive for high pressure fluid-handling apparatus having sufficient transmission of magnetic flux and capable of withstanding bursting pressures.

Accordingly, a magnetic drive embodying the present invention includes a magnetic driver member mounted on the drive shaft of an electric motor and a driven member rotatably mounted on mounting means coaxial to the shaft of the electric motor. The driver and driven members each include a plurality of permanent magnets to provide the magnetic force to cause rotation of the driven member. A thin diaphragm is mounted to separate the driver and the driven members and to provide sealing of the driver member. A thrust bearing is mounted on the drive shaft of the electric motor to provide support to the diaphragm when distended without hampering the rotation of the drive shaft while preventing contact between the drive shaft and the diaphragm.

In addition, as pointed out above, the problem of improving the efficiency of magnetic flux transmission and hence improving the force drive has gone hand in hand with the problem of sealing the driver member and rupture of the diaphragm. Some systems disclosed in the prior art have proposed employing magnetic drives comprising annular series of permanent magnets associated with the drive shaft to provide magnetic circuits for the transmission of rotation. A pair of toroids, for example, including a pair of discs each having a plurality of magnetic elements constituting a plurality of alternate north and south poles has thus been proposed.

The efficiency of performance of the magnetic drive however, is influenced by many factors, one of which being the thickness of the diaphragm employed as described above. Another factor affecting the efficiency of operation, i.e., the magnitude of the force transmitted to cause rotation of the driven member under load conditions, is believed to be the size of the magnets employed which is limited by the available space. In some instances, however, the available area has not been fully used, because of the particular magnet design employed with the consequent decrease in efficiency of operation.

It is therefore one of the major objects of this invention to provide an improved magnetic drive that comprises a pair of discs segmented into radially extending permanent wedge-shaped magnets. Each magnet includes planar faces respectively constituting north and south poles. Each polar face directly faces the opposite polarity face of the contiguous magnet on the same disc providing a magnetic field with that pole. In addition the poles of each magnet are aligned with opposite polarity poles of another magnet in the other disc to provide an inter-disc magnetic field.

An alternate embodiment in accordance with the invention comprises a pair of discs each having a planar face constituting a permanent magnet having north and south poles, and each pole extending substantially through one half of the surface area. Each of the poles exert a force on an opposite polarity of the corresponding opposite magnet. As can be clearly seen, this embodiment also utilizes efficiently the area that may be allocated for the permanent magnets. In addition, this alternate embodiment also includes a thin diaphragm mounted between the magnets to provide the required sealing of the driver member. As is the case in the embodiment described above, a thrust bearing is mounted on the drive shaft to protect the wearing of the diaphragm by preventing the friction between the diaphragm and the rotating drive shaft.

Other objects and advantages of the present invention will become apparent from the following detailed description and accompanying drawings in which:

FIG. 5 is a sectional view similar to the view shown in FIG. 2 of another magnetic drive embodying the invention; and FIG. 6 is a side view of the magnetic drive shown in FIG. 5.

Figure 1:
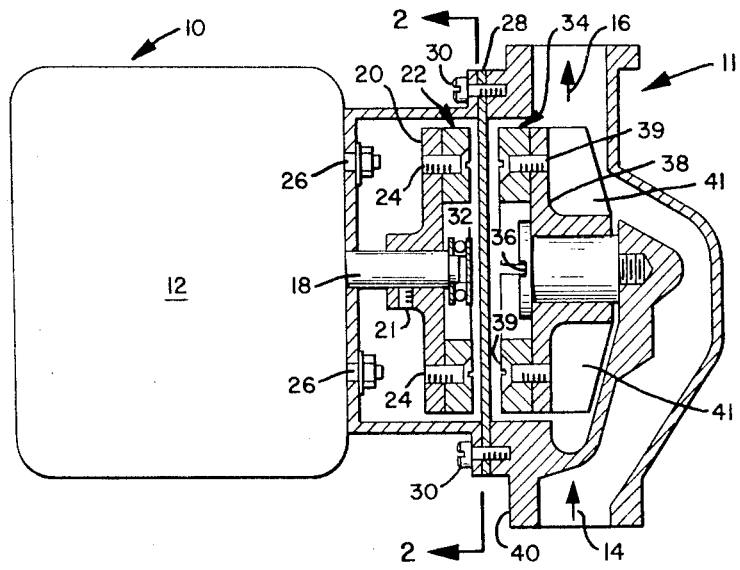
FIG. 1 is a plan view of a fluid-handling apparatus, partially broken away, including a magnetic drive embodying the invention.

Referring now to FIG. 1 of the drawing, there is shown a fluid-handling device including a magnetic drive embodying the present invention, comprising drive motor 10 mounted in a housing 12. A shaft 18 of the motor 10 is utilized to impart rotation of the magnetic driver element 22, mounted thereon. The magnetic driver 22 is magnetically coupled to an impeller or driven member 38, to impart rotation of the driven member 38 upon rotation of the shaft 18. A diaphragm 28 is mounted between housings 29 and 40, which respectively contain the driver 22 and the impeller 38 to provide isolation of the driver member 22 from the fluid impelled by the driven member 38.

The fluid-handling device illustrated in FIG. 1 may be for example a pump or compressor. As illustrated in the drawings, a motor 10 having a housing 12 is fixedly mounted on a base support (not shown), and adapted to be energized in well known manner by an appropriate power source (also not shown). The motor 10 is mechanically coupled to the fluid-handling device through the drive shaft 18. As illustrated by arrows in FIG. 1, fluid is introduced in the apparatus 11 at the inlet 14 at relatively low pressure and exhausted at the outlet 16 at a relatively high pressure.

Figure 2:
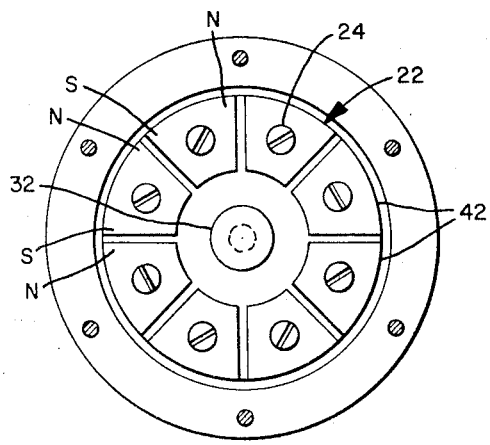
FIG. 2 is a sectional view taken along section line 2—2 in FIG. 1.
Figure 3:
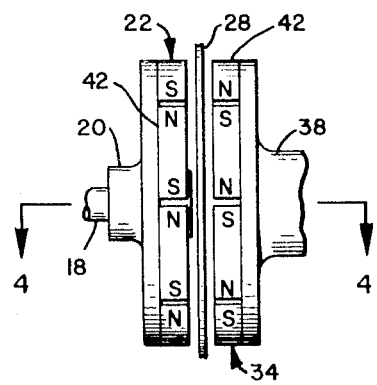
FIG. 3 is a side view of the magnetic drive shown in FIG. 2.
Figure 4:
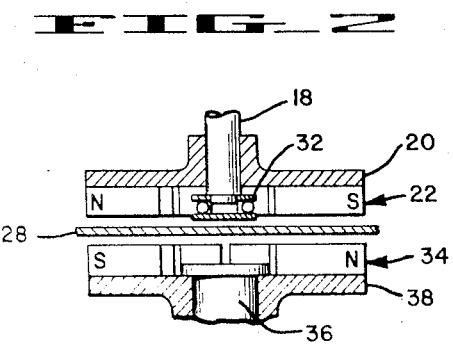
FIG. 4 is a top view of the magnetic drive shown in FIG. 2.

A driver member 22 is mounted on the drive shaft 18 of the electric motor 10, by means of a ferrous back-up plate 20 directly mounted on the shaft 18. The plate 20 is fixedly mounted with respect to the shaft 18 by means of a set screw 21. In turn, the driver member 22 is fixedly mounted on the back-up plate 20 by a set of screws 24. Both the plate 20 and the driver member 22 are circular in shape. The plate 20 includes a centrally located hub of sufficient size to slide the drive shaft 18 therethrough, and to provide a base for set screw 21 to fixedly set the back-up plate 20 with respect to the drive shaft 18. The driver element 22 is formed by a plurality of permanent magnets, as shown in FIG. 2, made of ferrite material preferably, although other materials having considerable magnetic retentivity may be employed. The driver element or disc 22 is shown in FIGS. 2, 3 and 4 in greater detail and will be described with a greater degree of particularity later on.

The fluid-handling apparatus 11 is contained in a housing 40 composed of two compartments held together by a set of screws 30. The housing 12 of motor 10 is in turn mechanically connected to the housing 40 by means of a set of screws or bolts 26.

The diaphragm 28 is also fixedly connected between the two housing compartments of the housing 40 by the same set of screws 30 to provide isolation between the magnetic driver and driven members 22 and 34 respectively housed in the two separate compartments of the housing 40.

The impeller 38 which includes a plurality of impeller blades 41, is driven rotationally around the axis provided by the screw 36, which is fixedly mounted on the housing 40. To this effect a driven member 34, which is similar to the driver member 22, is mechanically connected to the impeller 38 by a set of screws 39. The screw 36 provides a bearing surface to the impeller 38 to permit rotation of the impeller when the driven member is rotated by the rotation of the driven member 34.

The rotation of the impeller 38 provides a centrifugal force to the fluid received at the inlet 14 by means of the blades 41, in well known manner. Consequently, the fluid leaving at the outlet 16 is exhausted at a relatively high pressure. The rotation of the fluid causes the diaphragm to distend towards the driver shaft 18 due to the pressure built up by the rotating fluid. In order to prevent friction of the rotating drive shaft 18 against the diaphragm 28 and hence to prevent rupture of the diaphragm a thrust bearing 32 is mounted at the end of the shaft 18. The bearing 32, which is a conventional thrust bearing, has a load transmitting race fixedly mounted on the shaft 18 and a load receiving race mounted in relation to said load transmitting race on ball bearings or roller bearings as the case may be. The bearing 32 is conventionally illustrated in FIG. 1.

It should be noticed that the driver and driven members 22 and 34 are mounted in close proximity to the diaphragm 28 and hence to each other to permit high efficiency in flux transmission and hence in the transmission of the force drive. Also, as previously mentioned, the thickness of the diaphragm 28 is such to permit efficient flux transmission.

Because the driver and driven members 22 and 34 are similar, as indicated before, only the driver member 22 is shown in more detail in FIGS. 2, 3 and 4. The same numerals are employed in the various figures to indicate the same elements. The disc or magnetic driver member 22 includes a plurality of magnets 42 having a wedge-like shape, each having north and south poles N and S.

As shown in FIGS. 2 and 3, for example, each of the magnets has interfaces which constitute the respective north and south poles N and S. The polarity of the poles is such that each pole of each magnet faces an opposite polarity pole in the adjacent magnet. Also, the magnets in both the driver and the driven members are aligned with each other so that the poles of each magnet face opposite polarity poles across the diaphragm 28.

Another embodiment of the invention is illustrated in FIGS. 5 and 6. Primed numerals are employed therein to indicate elements similar to the elements illustrated in FIGS. 1–4. The embodiment illustrated in FIGS. 5 and 6 is employed in a fashion similar to the one described in connection with the embodiment illustrated in FIG. 1, so that a detailed description of its relative position with respect to the fluid-handling apparatus 11 is not deemed necessary.

The driver and driven members 22' and 34' of this embodiment of the invention are identical so that only the driver member 22' is shown in FIG. 5. The driver member 22' includes a permanent magnet 50, circular in form, having north and south poles N and S each pole extending approximately through half of the total area as indicated by a dashed line in FIG. 5.

As shown in FIG. 6, the driver and driven members 22' and 34' align their respective magnets with one another so that the poles of each magnet face a pole of opposite polarity whereby the rotation of the driver member causes each pole to exert an attraction force on the poles of the driven member thereby imparting similar rotation on the driven member.

It should be noticed that the embodiment illustrated in FIGS. 5 and 6 employs the available area in an efficient manner to provide a more efficient magnetic flux transmission which results in a more efficient operation under high load conditions.

In addition, it will be understood that modification and changes can be made on the illustrative embodiment of the invention shown and described herein without departing from the spirit of the invention or the scope of the following claims.

What is claimed is:

1. In a fluid-handling apparatus of the type including an electric motor and a housing having a fluid chamber, a magnetic drive comprising in combination: a rotatable driver member mounted on the shaft of said electric motor, a bearing member fixedly mounted on said housing coaxially with said shaft, a rotatably driven member mounted on said bearing member, said rotatably driven member having means for imparting motion to the fluid being handled, each of said driver and driven members comprising a plurality of wedge-shaped magnets mounted in an annular disc-type configuration with a radial air gap between adjacent magnets of each member, each of said magnets having a north and a south pole, contiguous poles of different magnets opposite-type polarity charge, a diaphragm fixedly mounted on said housing at a predetermined distance between said driver and driven members separating said coaxially mounted shaft and bearing members to keep said fluid within said fluid chamber, and a thrust bearing mounted on the shaft of said electric motor and spaced from the central portion of the disc during normal operation to prevent said diaphragm from coming in contact with said shaft while permitting unhampered rotation of said shaft.

2. A drive system for magnetically driving fluid-handling means of the type that increase the pressure of the fluid being handled, comprising in combination: an electric motor having a drive shaft; driving means fixedly mounted on said shaft including a plurality of magnets forming a toroid with radial air gaps, each of said magnets having a wedge-like shape and presenting a flat surface in a given direction, each of said magnets having north and south poles, contiguous poles of separate magnets being of opposite polarity; support means fixedly mounted with respect to said shaft and coaxially thereto; fluid-handling means for imparting rotation to said fluid and hence to increase its pressure, rotatably mounted on said support means; driven means fixedly coupled to said fluid-handling means including a plurality of magnets having wedge-like shape and presenting a flat surface to the flat surface of said driving means; a diaphragm mounted between said driving means and said driven means, said diaphragm being mounted at a predetermined distance from said driving means within fifty thousands of an inch, and from said driven means within five thousands of an inch, said diaphragm being made of non-ferrous material; and bearing means mounted on said shaft to prevent contact between said shaft and said diaphragm while permitting unhindered rotation of said shaft.

3. In a fluid-handling apparatus of the type including an electric motor and a housing having a fluid chamber, a magnetic drive comprising in combination: a driver member mounted on the shaft of said electric motor; a bearing member fixedly mounted on said housing coaxially with said shaft; a rotatable member mounted on said bearing member, said rotatable member having means for imparting motion to the fluid being handled, each of said driver and driven members comprising a plurality of wedge-shaped magnets mounted in an annular disc-type configuration with a radial air gap between adjacent magnets of each member so that when said driver member is rotated by the rotation of said shaft said rotatable member is rotated by a magnetic force provided by said magnets, each of said magnets having a north and a south pole with the pole faces of said poles lying in a plane containing the axis of the annular disc, contiguous poles of different magnets having opposite-type polarity to decrease the slippage with increased loads; a diaphragm fixedly mounted on said housing at a predetermined distance between said driver member and said rotatable member separating said coaxially mounted shaft and bearing members to keep said fluid within said fluid chamber, and a thrust bearing mounted on the shaft of said electric motor to prevent said diaphragm from coming in contact with said shaft while permitting unhampered rotation of said shaft.

4. A magnetic drive comprising in combination: an electric motor having a drive shaft, a driver member mounted on said drive shaft, a bearing member mounted separately from said shaft and coaxially thereto, and a driven member rotatably mounted on said bearing member, each of said driver and driven members comprising a plurality of wedge-shaped magnets with a radial air gap between adjacent magnets of each member and each magnet having north and south pole faces, each of said pole faces of each of said magnets being spaced from and placed facing an opposite polarity pole face of an adjacent magnet of the same member to provide a magnetic field between every one of said magnets.

5. In combination: an electric motor having a drive shaft; driving means fixedly mounted on said shaft including a plurality of wedge-shaped permanent magnets with a radial air gap between each magnet and with each magnet having north and south poles with each pole face of said magnets lying in a plane containing the axis of said shaft and contiguous poles of different magnets having opposite type polarity; support means fixedly mounted with respect to said shaft and coaxially thereto; and driven means rotatably mounted on said support means including a plurality of wedge-shaped permanent magnets with a radial air gap between each magnet and with each magnet having north and south poles with each pole face of said magnets lying in a plane containing the axis of said shaft and contiguous poles of different magnets having opposite type polarity so that when said driving means are rotated by said motor shaft a force of attraction is exerted between each of the poles of each of said magnets in the driver member and an opposite polarity pole of a corresponding magnet in the driven member, which causes said driven member to rotate.

6. A magnetic drive assembly comprising, in combination, a driver member, means for rotatably supporting said driver member for rotation about an axis, a driven member, means for rotatably supporting said driven member for rotation about said axis and spaced from said driver member, each of said driver and driven members including a plurality of wedge-shaped permanent magnets mounted in an annular disc-type configuration about said axis with a radial air gap between adjacent magnets of each member, each of said magnets having a north and a south pole with contiguous poles of different magnets of opposite-type polarity whereby when said driver member is rotated a force of attraction is exerted between each of the poles of each of said magnets of said driver member and an opposite polarity pole of a corresponding magnet in the driven member thereby causing said driven member to rotate.

References Cited by the Examiner

UNITED STATES PATENTS

| | | | |
|---|---|---|---|
| 2,638,558 | 5/1953 | Rankin | 103—87 X |
| 2,975,713 | 3/1961 | Wright | 103—87 |

FOREIGN PATENTS 166,976    2/1956    Australia.

ROBERT M. WALKER, *Primary Examiner.*